United States Patent
Sumi et al.

(10) Patent No.: US 11,422,540 B2
(45) Date of Patent: Aug. 23, 2022

(54) PROCESS DECISION SUPPORT DEVICE, PROCESS DECISION SUPPORT METHOD, AND STORAGE MEDIUM

(71) Applicant: Mitsubishi Electric Corporation, Tokyo (JP)

(72) Inventors: Nobuyuki Sumi, Tokyo (JP); Shun Kayashima, Tokyo (JP); Kenji Iriguchi, Tokyo (JP); Seiji Uozumi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/049,578

(22) PCT Filed: Jun. 7, 2018

(86) PCT No.: PCT/JP2018/021944
§ 371 (c)(1),
(2) Date: Oct. 22, 2020

(87) PCT Pub. No.: WO2019/234898
PCT Pub. Date: Dec. 12, 2019

(65) Prior Publication Data
US 2021/0240171 A1 Aug. 5, 2021

(51) Int. Cl.
*G05B 19/418* (2006.01)
*G05B 19/4097* (2006.01)
*G06Q 50/04* (2012.01)

(52) U.S. Cl.
CPC ... *G05B 19/41865* (2013.01); *G05B 19/4097* (2013.01); *G06Q 50/04* (2013.01);
(Continued)

(58) Field of Classification Search
CPC .......... G05B 19/41865; G05B 19/4097; G05B 2219/35179; G05B 2219/32304; G05B 2219/32283; G06Q 50/04
See application file for complete search history.

(56) References Cited

U.S. PATENT DOCUMENTS 5,717,598 A * 2/1998 Miyakawa ......... G05B 19/4097
700/103
2003/0171842 A1 9/2003 Teramoto et al.
(Continued)

FOREIGN PATENT DOCUMENTS

CN 103942610 A 7/2014
EP 3327655 A1 5/2018
(Continued)

OTHER PUBLICATIONS

K.G. Jones, "Rapid Prototyping Decision Support System", 1997 International Solid Freeform Fabrication Symposium, 1997, pp. 551-558 Retrieved from the Internet URL:<https://repositories.lib.utexas.edu/bitstream/handle/2152/71433/1997-64-Jones.pdf?sequence=2&isAllowed=y> (Year: 1997).*

(Continued)

*Primary Examiner* — Kenneth M Lo
*Assistant Examiner* — Jonathan Michael Skrzycki
(74) *Attorney, Agent, or Firm* — Xsensus LLP

(57) ABSTRACT

A process decision support device includes: a machining performance data storage unit that stores machining performance data indicating machining performance of each of a plurality of machining devices including a machining device that adds material and a machining device that removes material; a process pattern generation unit that refers to the machining performance data and sequences and allocates machining steps performed by a combination of any of the plurality of machining devices to generate a process pattern as a combination of the machining steps with which a (Continued)

product is manufacturable; and an output unit that outputs content of the process pattern generated by the process pattern generation unit.

9 Claims, 11 Drawing Sheets

(52) U.S. Cl.
CPC .............. *G05B 2219/32283* (2013.01); *G05B 2219/32304* (2013.01); *G05B 2219/35179* (2013.01)

(56) References Cited

U.S. PATENT DOCUMENTS

| | | | |
|---|---|---|---|
| 2003/0204279 A1 | 10/2003 | Yokohari et al. | |
| 2017/0057011 A1 | 3/2017 | Hyatt et al. | |
| 2019/0204813 A1* | 7/2019 | Behandish | G05B 19/4188 |

FOREIGN PATENT DOCUMENTS

| | | | | |
|---|---|---|---|---|
| JP | 5-114003 A | | 5/1993 | |
| JP | 2000075905 | * | 3/2000 | .............. Y02P 90/02 |
| JP | 2003-316830 A | | 11/2003 | |
| JP | 2005-309713 A | | 11/2005 | |
| JP | 2015-170008 A | | 9/2015 | |
| JP | 2016-9351 A | | 1/2016 | |
| JP | 2017-515678 A | | 6/2017 | |
| JP | 2017-187862 A | | 10/2017 | |
| WO | WO 02/41090 | * | 5/2002 | ........... G05B 19/418 |

OTHER PUBLICATIONS

Extended European search report dated Mar. 19, 2021, in corresponding European patent Application No. 18921331.7, 8 pages.
Hongbo Lan, "Web-based rapid prototyping and manufacturing systems: A review", Computers in Industry, vol. 60, 2009, pp. 643-656.
International Search Report and Written Opinion dated Aug. 7, 2018 for PCT/JP2018/021944 filed on Jun. 7, 2018, 10 pages including English Translation of the International Search Report.
Notice of Reasons for Refusal received for Japanese Patent Application No. 2018-568455, dated Apr. 9, 2019, 10 pages including English Translation.
Decision to Grant a Patent received for Japanese Patent Application No. 2018-568455, dated Jul. 9, 2019, 5 pages including English Translation.
Chinese Office Action dated May 8, 2021 in Chinese Application No. 2018800941533.
Office Action dated Sep. 23, 2021, in corresponding European patent Application No. 18921331.7, 5 pages.

* cited by examiner

FIG.5

| PROCESS PATTERN 1 | ADDITION | | | |
| --- | --- | --- | --- | --- |
| | DEVICE A1 | | | |
| PROCESS PATTERN 2 | PURCHASE | REMOVAL | | |
| | MATERIAL C1 | DEVICE B1 | | |
| PROCESS PATTERN 3 | ADDITION | REMOVAL | | |
| | DEVICE A2 | DEVICE B1 | | |
| PROCESS PATTERN 4 | PURCHASE | ADDITION | REMOVAL | |
| | PART D1 | DEVICE A2 | DEVICE B1 | |
| PROCESS PATTERN 5 | PURCHASE | REMOVAL | ADDITION | REMOVAL |
| | MATERIAL C2 | DEVICE B2 | DEVICE A2 | DEVICE B1 |

FIG.8

| | | | | | |
|---|---|---|---|---|---|
| PROCESS PATTERN 1 | ADDITION | | | | TOTAL |
| | DEVICE A1 | | | | |
| TIME | $\alpha 1$ | | | | $\alpha 1$ |
| COST | $\beta 1$ | | | | $\beta 1$ |

| | | | | | |
|---|---|---|---|---|---|
| PROCESS PATTERN 2 | PURCHASE | REMOVAL | | | TOTAL |
| | MATERIAL C1 | DEVICE B1 | | | |
| TIME | $\alpha 2$ | $\alpha 3$ | | | $\alpha 2 + \alpha 3$ |
| COST | $\beta 2$ | $\beta 3$ | | | $\beta 2 + \beta 3$ |

| | | | | | |
|---|---|---|---|---|---|
| PROCESS PATTERN 3 | ADDITION | REMOVAL | | | TOTAL |
| | DEVICE A2 | DEVICE B1 | | | |
| TIME | $\alpha 4$ | $\alpha 5$ | | | $\alpha 4 + \alpha 5$ |
| COST | $\beta 4$ | $\beta 5$ | | | $\beta 4 + \beta 5$ |

| | | | | | |
|---|---|---|---|---|---|
| PROCESS PATTERN 4 | PURCHASE | ADDITION | REMOVAL | | TOTAL |
| | PART D1 | DEVICE A2 | DEVICE B1 | | |
| TIME | $\alpha 6$ | $\alpha 7$ | $\alpha 8$ | | $\alpha 6 + \alpha 7 + \alpha 8$ |
| COST | $\beta 6$ | $\beta 7$ | $\beta 8$ | | $\beta 6 + \beta 7 + \beta 8$ |

| | | | | | |
|---|---|---|---|---|---|
| PROCESS PATTERN 5 | PURCHASE | REMOVAL | ADDITION | REMOVAL | TOTAL |
| | MATERIAL C2 | DEVICE B2 | DEVICE A2 | DEVICE B1 | |
| TIME | $\alpha 9$ | $\alpha 10$ | $\alpha 11$ | $\alpha 12$ | $\alpha 9 + \alpha 10 + \alpha 11 + \alpha 12$ |
| COST | $\beta 9$ | $\beta 10$ | $\beta 11$ | $\beta 12$ | $\beta 9 + \beta 10 + \beta 11 + \beta 12$ |

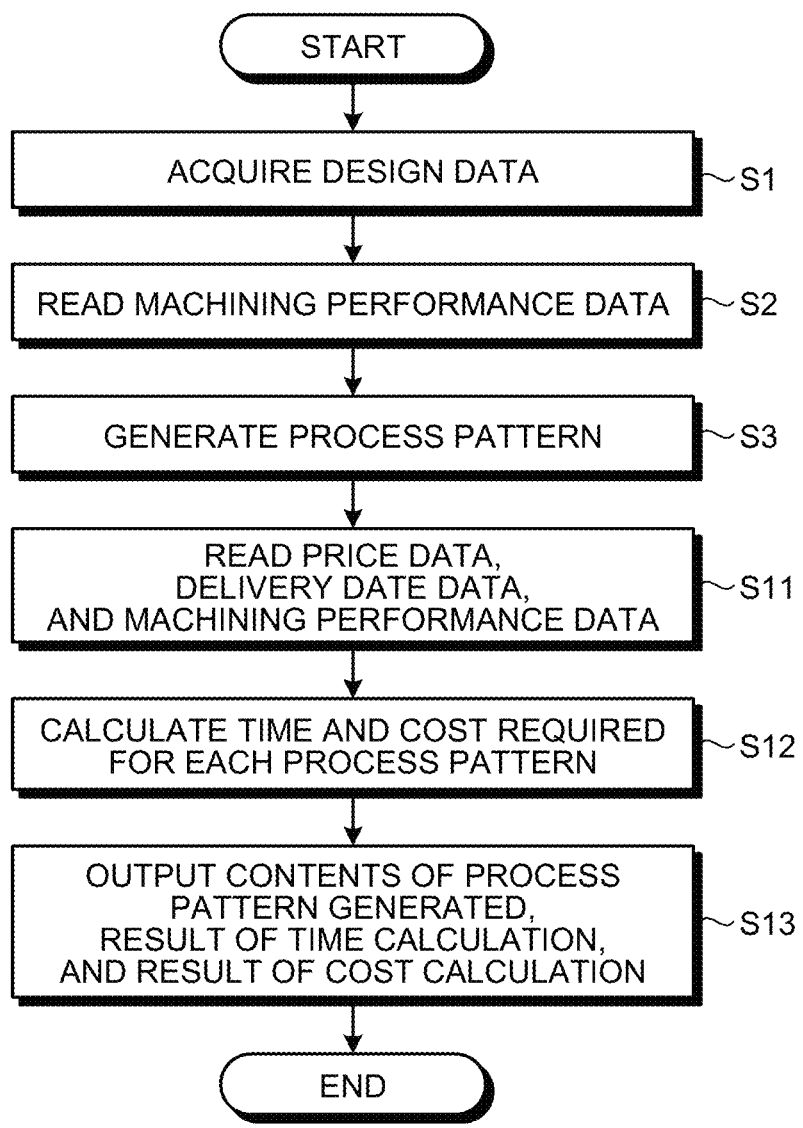

FIG.11

| | | | | | TOTAL | RANK |
|---|---|---|---|---|---|---|
| PROCESS PATTERN 1 | ADDITION | | | | | |
| | DEVICE A1 | | | | | |
| TIME | α1 | | | | α1 | 5 |
| COST | β1 | | | | β1 | |
| PROCESS PATTERN 2 | PUR-CHASE | REMOVAL | | | | |
| | MATERIAL C1 | DEVICE B1 | | | | |
| TIME | α2 | α3 | | | α2+α3 | 4 |
| COST | β2 | β3 | | | β2+β3 | |
| PROCESS PATTERN 3 | ADDITION | REMOVAL | | | | |
| | DEVICE A2 | DEVICE B1 | | | | |
| TIME | α4 | α5 | | | α4+α5 | 2 |
| COST | β4 | β5 | | | β4+β5 | |
| PROCESS PATTERN 4 | PUR-CHASE | ADDITION | REMOVAL | | | |
| | PART D1 | DEVICE A2 | DEVICE B1 | | | |
| TIME | α6 | α7 | α8 | | α6+α7+α8 | 3 |
| COST | β6 | β7 | β8 | | β6+β7+β8 | |
| PROCESS PATTERN 5 | PUR-CHASE | REMOVAL | ADDITION | REMOVAL | | |
| | MATERIAL C2 | DEVICE B2 | DEVICE A2 | DEVICE B1 | | |
| TIME | α9 | α10 | α11 | α12 | α9+α10+α11+α12 | 1 |
| COST | β9 | β10 | β11 | β12 | β9+β10+β11+β12 | |

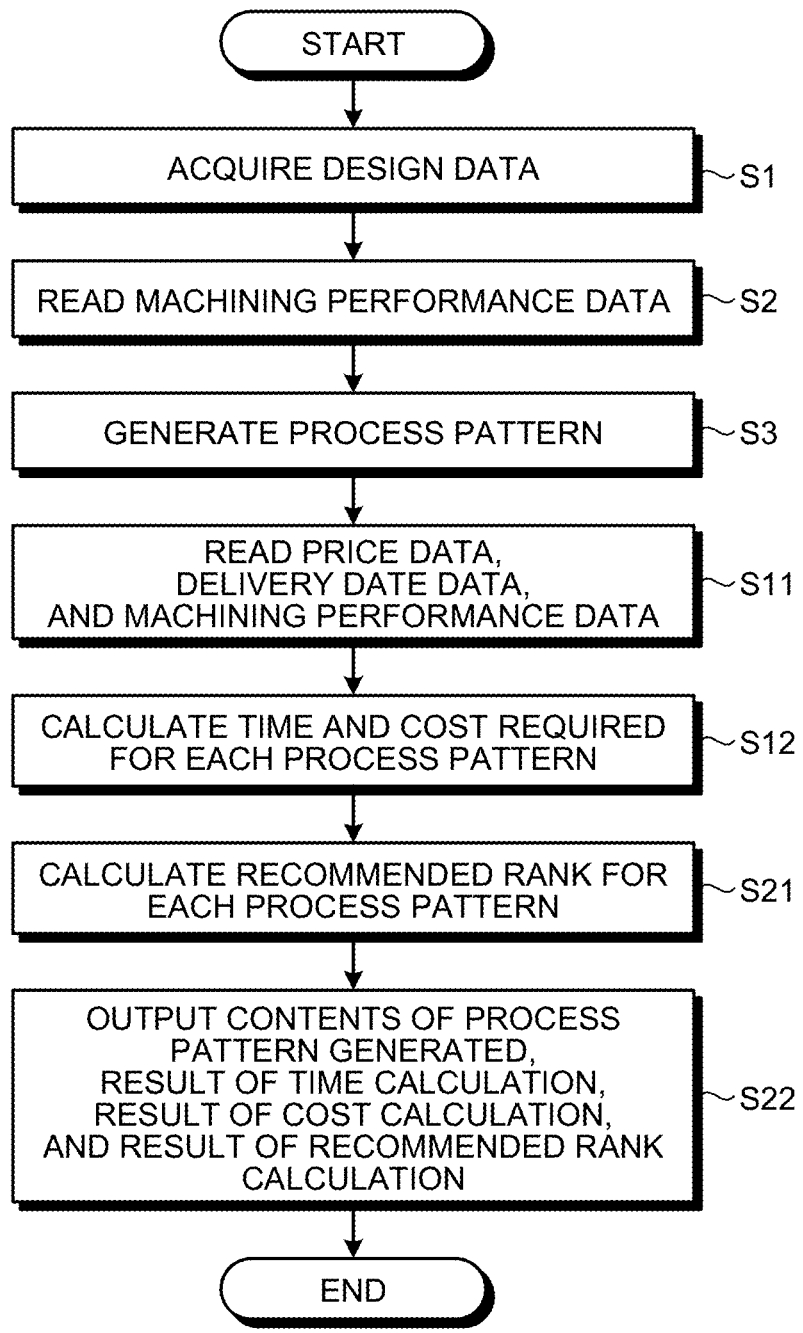

PROCESS DECISION SUPPORT DEVICE, PROCESS DECISION SUPPORT METHOD, AND STORAGE MEDIUM

CROSS-REFERENCE TO RELATED APPLICATION

The present application is based on PCT filing PCT/JP2018/021944, filed Jun. 7, 2018, the entire contents of which are incorporated herein by reference.

FIELD

The present invention relates to a process decision support device, a process decision support method, and a storage medium for supporting the decision of a manufacturing process for manufacturing a product.

BACKGROUND

Conventionally, various machining devices have been used in the manufacture of products by material machining that is based on design data. Patent Literature 1 discloses a technique related to the manufacture of products by material machining, specifically, a technique for an information processing device that selects a machining device to request machining from among a plurality of machining devices having different machining performances.

CITATION LIST

Patent Literature

Patent Literature 1: Japanese Patent Application Laid-open No. 2016-9351

SUMMARY

Technical Problem

Known machining devices that perform material machining include machining devices that remove material and machining devices that add material. In the manufacture of products, the cost and time required for manufacturing may be reduced by performing machining with a combination of multiple machining devices such as a machining device for removing material and a machining device for adding material, rather than creating a desired machining shape with only a single machining device. However, it has been conventionally entrusted to the user's know-how to combine machining devices such that appropriate machining can be performed. The information processing device of Patent Literature 1 described above does not select machining devices for combining machining devices that enable appropriate machining. Therefore, even when the technique of Patent Literature 1 described above is applied, the selection of machining devices for combining machining devices that enable appropriate machining is entrusted to the user's thoughts.

According to the conventional technique, determination as to whether a combination of machining steps performed by a plurality of machining devices is suitable for manufacturing the product indicated by design data is performed by a user who has knowledge of the specifications of each machining device. Because experience or trial and error may be required for the determination of suitability for manufacturing the product, it is difficult for an inexperienced user to determine a manufacturing process. Therefore, the conventional technique is problematic in that it may be difficult to determine a manufacturing process including machining steps performed by a plurality of machining devices.

The present invention has been made in view of the above, and an object thereof is to obtain a process decision support device that enables easy determination of a manufacturing process including machining steps performed by a plurality of machining devices.

Solution to Problem

In order to solve the above-mentioned problems and achieve the object, a process decision support device according to the present invention supports decision of a manufacturing process for manufacturing a product. The process decision support device according to the present invention includes a machining performance data storage unit that stores machining performance data indicating machining performance of each of a plurality of machining devices including a machining device that adds material and a machining device that removes material. The process decision support device according to the present invention includes a process pattern generation unit that refers to the machining performance data and sequences and allocates machining steps performed by a combination of any of the plurality of machining devices to generate a process pattern as a combination of the machining steps with which the product is manufacturable. The process decision support device according to the present invention includes an output unit that outputs content of the process pattern generated by the process pattern generation unit.

Advantageous Effects of Invention

The process decision support device according to the present invention can achieve the effect of enabling easy determination of a manufacturing process including machining steps performed by a plurality of machining devices.

BRIEF DESCRIPTION OF DRAWINGS

FIG. 5 is a diagram illustrating a display example of the contents of process patterns generated by the process pattern generation unit illustrated in FIG. 1.

FIG. 8 is a diagram illustrating a display example of results of calculation by a time calculation unit of the process decision support device illustrated in FIG. 7 and results of calculation by a cost calculation unit of the process decision support device.

FIG. 9 is a flowchart illustrating the procedure of operation by the process decision support device illustrated in FIG. 7.

FIG. 11 is a diagram illustrating a display example of results of calculation by a rank calculation unit of the process decision support device illustrated in FIG. 10.

FIG. 12 is a flowchart illustrating the procedure of operation by the process decision support device illustrated in FIG. 10.

DESCRIPTION OF EMBODIMENTS

Hereinafter, a process decision support device, a process decision support method, and a storage medium according to embodiments of the present invention will be described in detail with reference to the drawings. The present invention is not limited to the embodiments.

First Embodiment

Figure 1:
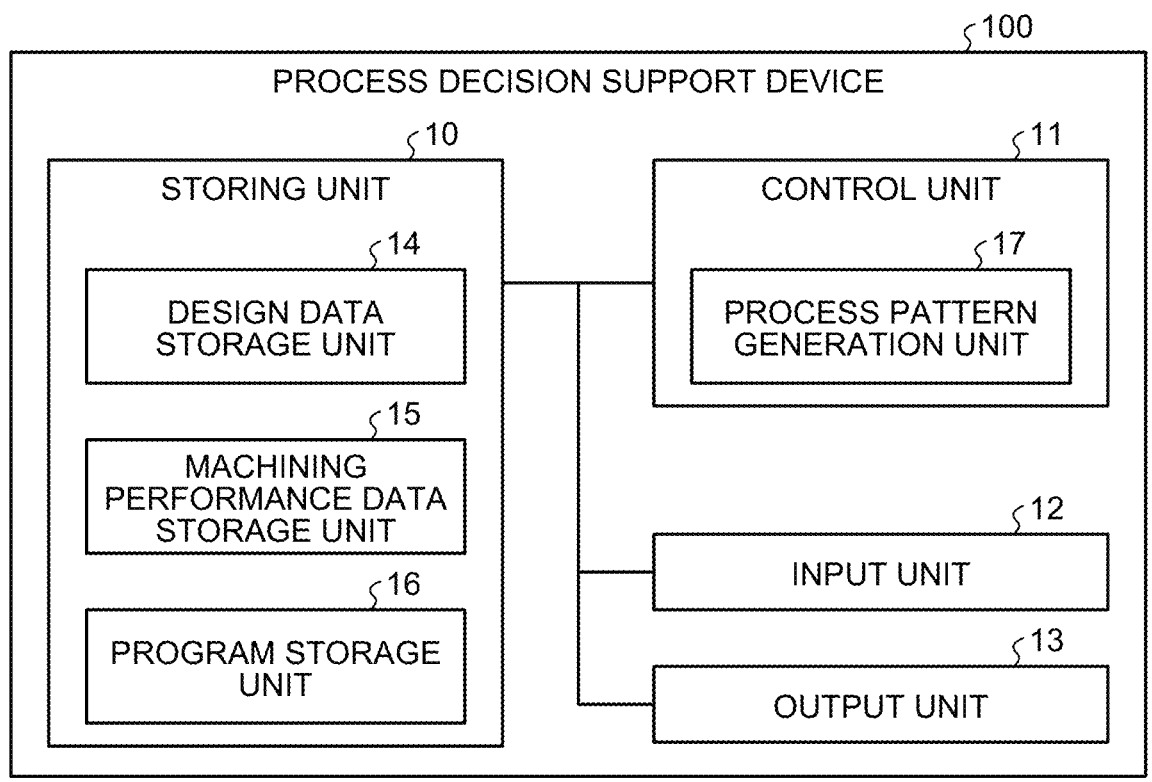
FIG. 1 is a block diagram illustrating a configuration of a process decision support device according to a first embodiment of the present invention.

FIG. 1 is a block diagram illustrating a configuration of a process decision support device 100 according to the first embodiment of the present invention. The process decision support device 100 is a computer with a process decision support program installed thereon. The process decision support device 100 supports the decision of a manufacturing process for manufacturing a product. The process decision support program is a program having the function of supporting the decision of a manufacturing process.

The process decision support device 100 supports the decision of a manufacturing process including a machining step selected from among machining steps performed by a plurality of machining devices. A plurality of machining devices include a machining device that performs additive machining to add material and a machining device that performs removal machining to remove material. A machining device that performs additive machining is an additive manufacturing device that deposits melted material to shape a three-dimensional object. An additive manufacturing device uses a heat source such as laser beams or arc discharge to melt material. Material to be melted may be either wire or powder. A machining device that performs removal machining is a cutting machine that cuts material using a cutting tool, an electric discharge machine that removes material using discharge energy, or a laser processing machine that removes material using laser beams.

A plurality of machining devices may include a machining device other than a machining device that performs additive machining and a machining device that performs removal machining. Any machining device that processes material may be used, such as a machining device that performs plastic forming to deform material or a machining device that performs welding machining to weld material. Any material that can be processed by a machining device may be used as a material for products.

A machining step represents a work stage that is handled by each machining device in the process of completing a product by machining. It is assumed that machining steps that differ from each other in at least one of the type of machining such as addition or removal, the amount of machining, and machining dimension accuracy are different machining steps. The amount of machining is the size that can be processed by a machining device. Specifically, the amount of machining represents the height of a three-dimensional object that can be shaped in the case of additive machining, and represents the thickness of a removable material in the case of removal machining. Machining dimensional accuracy is a unit amount of machining. Specifically, machining dimensional accuracy represents the minimum thickness that can be added in the case of additive machining, and represents the minimum thickness that can be removed in the case of removal machining. If a single machining device can perform machining with different amounts of machining or different degrees of machining dimensional accuracy, this machining device can handle a plurality of machining steps.

The process decision support device 100 includes a storing unit 10 which is a functional unit that stores various programs and various data, a control unit 11 which is a functional unit that controls the entire process decision support device 100, an input unit 12 which is a functional unit that inputs information, and an output unit 13 which is a functional unit that outputs information. The storing unit 10, the control unit 11, the input unit 12, and the output unit 13 are communicably connected to one another.

The storing unit 10 includes a design data storage unit 14 which is a functional unit that stores design data, a machining performance data storage unit 15 which is a functional unit that stores machining performance data, and a program storage unit 16 which is a functional unit that stores the process decision support program. Design data are computer-aided design (CAD) data including data on product design particulars such as product shape and size, material, and manufacturing accuracy. The design data storage unit 14 stores the design data input by the input unit 12.

Machining performance data are data representing machining performance such as machining speed, machining surface roughness, machining dimensional accuracy, and machining stroke. Machining performance data are data unique to each machining device. The machining performance data storage unit 15 stores machining performance data of a plurality of machining devices including a machining device that performs additive machining and a machining device that performs removal machining. The process decision support device 100 retrieves machining performance data published by the manufacturers of machining devices. For example, the process decision support device 100 retrieves machining performance data from a website provided by a manufacturer on the Internet or from a storage medium provided by a manufacturer. The process decision support device 100 may retrieve machining performance data through manual input by the user. The machining performance data storage unit 15 stores the retrieved machining performance data. The machining performance data storage unit 15 may store the machining performance data edited by the user.

The control unit 11 includes a process pattern generation unit 17 which is a functional unit that generates a process pattern. The process pattern generation unit 17 refers to the machining performance data stored in the machining performance data storage unit 15 and sequences and allocates machining steps performed by machining devices included in a plurality of machining devices to generate a process pattern which includes a machining step and with which a product is manufacturable. The process pattern generation unit 17 can generate a process pattern as a combination of multiple machining steps performed by a plurality of machining devices. The process pattern generation unit 17 can generate a plurality of process patterns that differ in at least one of the sequence and combination of machining steps. The process pattern generation unit 17 may generate a process pattern involving only a single machining step performed by a single machining device.

The process pattern generation unit 17 may generate a process pattern including procurement of material. The process pattern generation unit 17 may generate a process pattern including procurement of parts manufactured by a device other than the machining devices included in a plurality of machining devices. In the first embodiment, a part refers to an article that constitutes a product.

The output unit 13 outputs the contents of process patterns generated by the process pattern generation unit 17. The output unit 13 outputs the contents of process patterns by displaying the contents of the process patterns on the screen. The user refers to the contents output by the output unit 13 and chooses a manufacturing process for manufacturing a product from among the process patterns generated by the process pattern generation unit 17. Note that the output unit 13 may output the contents of process patterns by printing out the contents of the process patterns.

Figure 2:
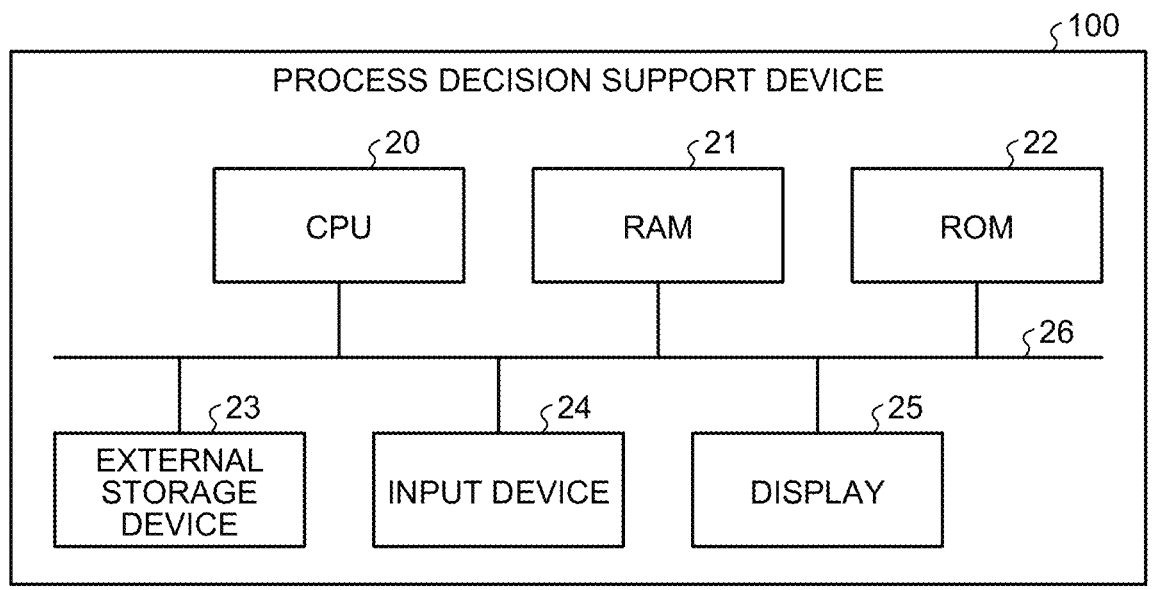
FIG. 2 is a diagram illustrating a hardware configuration of the process decision support device illustrated in FIG. 1.

FIG. 2 is a diagram illustrating a hardware configuration of the process decision support device 100 illustrated in FIG. 1. The process decision support device 100, which is a computer with the process decision support program installed thereon, includes a central processing unit (CPU) 20 that executes various processes, a random access memory (RAM) 21 including a program storage area and a data storage area, a read only memory (ROM) 22 that is a non-volatile memory, and an external storage device 23 that stores data. The process decision support device 100 includes an input device 24 for inputting information according to the user's operation and a display 25 as an output device for displaying information on the screen. The components of the process decision support device 100 illustrated in FIG. 2 are connected to one another via a bus 26.

The input device 24 is a pointing device and a keyboard. The function of the input unit 12 illustrated in FIG. 1 is implemented using the input device 24. One example of the display 25 is a liquid crystal display with a liquid crystal panel. The function of the output unit 13 illustrated in FIG. 1 is implemented using the display 25. Note that a printer, which is one of the output devices other than the display 25, may be connected to the process decision support device 100.

The CPU 20 executes programs stored in the ROM 22 and the external storage device 23. The function of the control unit 11 illustrated in FIG. 1 is implemented using the CPU 20. The external storage device 23 is a solid state drive (SSD) or a hard disk drive (HDD). The external storage device 23 stores design data, machining performance data, and the process decision support program. The functions of the storing unit 10 illustrated in FIG. 1 are implemented using the external storage device 23. The ROM 22 stores a basic input/output system (BIOS) or a unified extensible firmware interface (UEFI), which is a program for controlling the basic operation of the computer, namely the process decision support device 100.

Programs stored in the ROM 22 and the external storage device 23 are loaded into the RAM 21. The CPU 20 loads the programs in the program storage area in the RAM 21 to execute various processes.

The process decision support program may be recorded on a storage medium readable by a computer. The process decision support device 100 may store, in the external storage device 23, the process decision support program recorded on the storage medium. The storage medium may be a portable storage medium which is a flexible disk or a flash memory which is a semiconductor memory. The process decision support program may be installed on the process decision support device 100 from another computer or a server device via a communication network.

Figure 3:
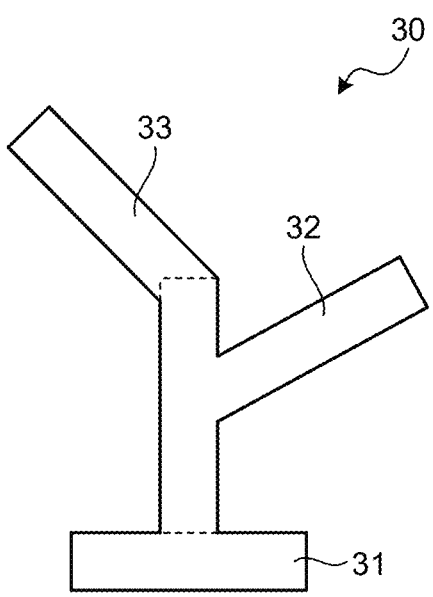
FIG. 3 is a diagram for explaining generation of a process pattern by a process pattern generation unit of the process decision support device illustrated in FIG. 1.

Next, a process pattern that is generated by the process pattern generation unit 17 will be described. FIG. 3 is a diagram for explaining generation of a process pattern by the process pattern generation unit 17 of the process decision support device 100 illustrated in FIG. 1. FIG. 3 is a side view of a specific example of a product 30 as the subject of a manufacturing process decision. The shape of the product 30 may be any shape that can be created by a plurality of machining devices.

Based on the design data read from the design data storage unit 14, the process pattern generation unit 17 obtains the design particulars of the product 30, namely shape, size, material, and manufacturing accuracy. The process pattern generation unit 17 refers to the machining performance data stored in the machining performance data storage unit 15 and selects a machining device capable of performing machining that satisfies the design particulars of the product 30. In a case where the process pattern generation unit 17 determines that the entire product 30 can be completed by a machining step performed by a single machining device, the process pattern generation unit 17 selects the machining step from among a plurality of machining steps performed by a plurality of machining devices, and generates a process pattern involving only the selected machining step. For example, in a case where the process pattern generation unit 17 determines that machining that satisfies the design particulars of the product 30 can be achieved by a machining step performed by a single machining device for additive machining, the process pattern generation unit 17 generates a process pattern involving only the additive machining.

The process pattern generation unit 17 can divide the product 30 into a plurality of sections to generate a process pattern as a combination of machining steps allocated to the sections. The process pattern generation unit 17 sets a plurality of sections by appropriately determining suitable positions for division into machining steps based on the shape of the product 30. In the example illustrated in FIG. 3, the process pattern generation unit 17 divides the product 30 into three sections 31, 32, and 33. One product can be divided into any number of sections.

The process pattern generation unit 17 may generate a process pattern including procurement of the sections 31, 32, and 33 constituting the product 30 as parts. The process pattern generation unit 17 may generate a process pattern as a combination of machining steps performed by machining devices having different degrees of machining surface roughness or machining dimensional accuracy. The process pattern generation unit 17 generates a process pattern including a plurality of machining steps by selecting machining steps performed by two or more machining devices and sequencing and allocating the selected machining steps. The process pattern generation unit 17 can generate a process pattern as an appropriate combination of additive machining and removal machining steps. The process pattern generation unit 17 may combine a plastic forming step or a welding machining step with a process pattern. In this way, the process pattern generation unit 17 generates process patterns that are candidates for the manufacturing process of the product 30.

Figure 4:
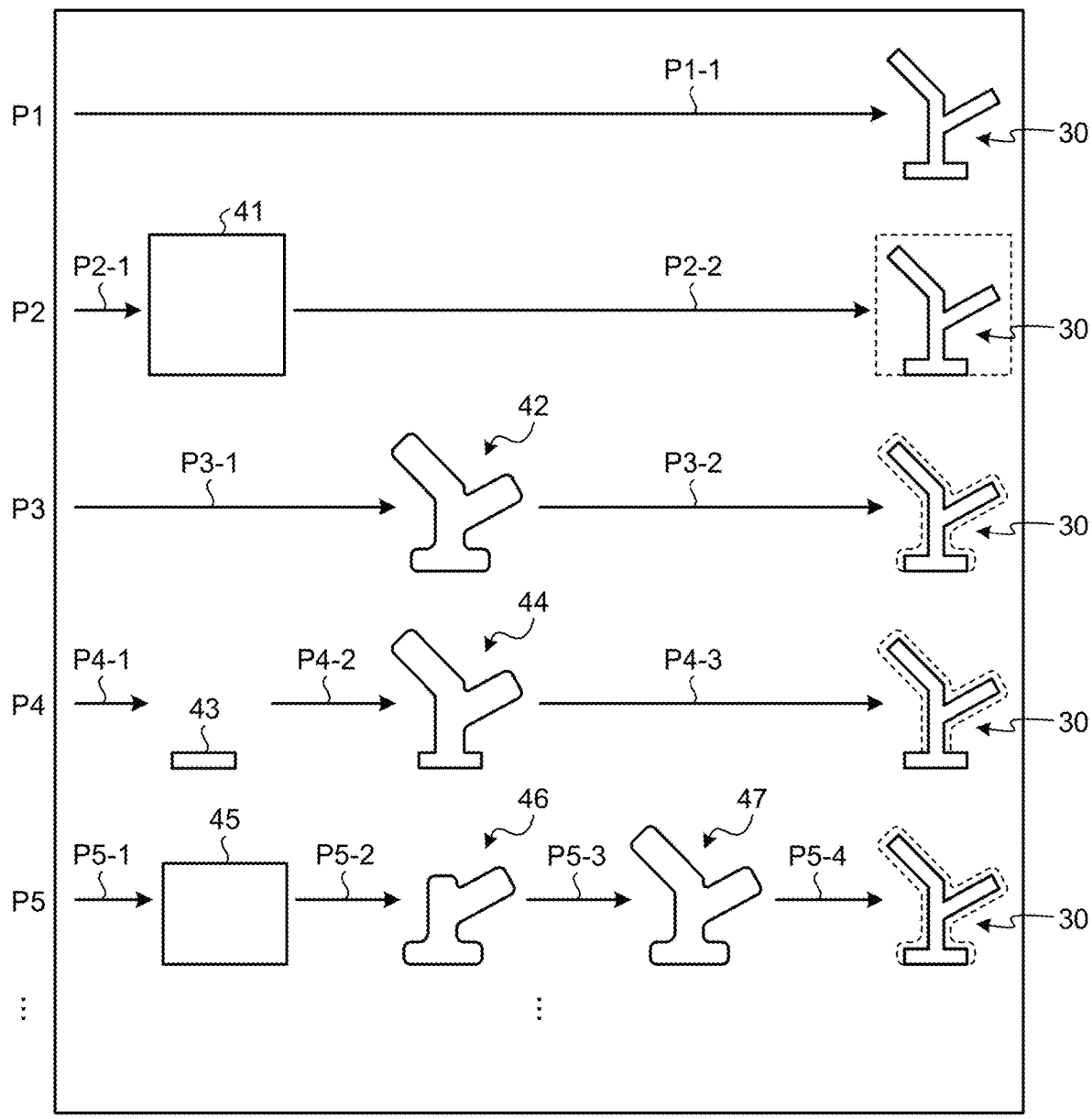
FIG. 4 is a diagram illustrating examples of process patterns generated by the process pattern generation unit illustrated in FIG. 1.

FIG. 4 is a diagram illustrating examples of process patterns generated by the process pattern generation unit 17 illustrated in FIG. 1. The following description is based on the assumption that four machining devices including two machining devices for additive machining and two machining devices for removal machining can be used for manufacturing the product 30. One of the two machining devices for adding material is referred to as "device A1", and the other is referred to as "device A2". One of the two machining devices for removing material is referred to as "device B1", and the other is referred to as "device B2". The machining dimensional accuracy of "device A1" is higher than the machining dimensional accuracy of "device A2". Machining performed by "device A1" may be referred to as high-accuracy additive machining, and machining performed by "device A2" may be referred to as low-accuracy additive machining. The machining dimensional accuracy of "device B1" is higher than the machining dimensional accuracy of "device B2". Machining performed by "device B1" may be referred to as high-accuracy removal machining, and machining performed by "device B2" may be referred to as low-accuracy removal machining.

The four machining devices may be machining devices that the user owns, machining devices that the user can borrow to use from others, or machining devices that the user plans to own or borrow. The machining performance data storage unit 15 stores the machining performance data of the four machining devices.

FIG. 4 depicts first, second, third, fourth, and fifth process patterns P1, P2, P3, P4, and P5, which are five process patterns of the process patterns with which the product 30 is manufacturable. The first process pattern P1 is a process pattern consisting only of a first step P1-1. The first step P1-1 is a machining step performed by "device A1" for obtaining the whole shape of the product 30 with high-accuracy additive machining.

The second process pattern P2 is a combination of a first step P2-1 and a second step P2-2. The first step P2-1 is a step for procuring a material 41 by purchasing the material 41. The second step P2-2 is a machining step performed by "device B1" for obtaining the whole shape of the product 30 with high-accuracy removal machining.

The third process pattern P3 is a combination of a first step P3-1 and a second step P3-2. The first step P3-1 is a machining step performed by "device A2" in which a three-dimensional object 42 is obtained with low-accuracy additive machining. Every portion of the three-dimensional object 42 still has a portion to be removed so that the whole shape of the product 30 can be obtained. "Device A2" performs what is called near net shaping to obtain a shape close to the shape of the product 30. The second step P3-2 is a machining step performed by "device B1" for obtaining the whole shape of the product 30 by performing high-accuracy removal machining on the three-dimensional object 42.

The fourth process pattern P4 is a combination of a first step P4-1, a second step P4-2, and a third step P4-3. The first step P4-1 is a step for procuring a part 43 by purchasing the part 43. The part 43 is a part corresponding to the section 31 of the product 30 illustrated in FIG. 3. The second step P4-2 is a machining step performed by "device A2" for obtaining a three-dimensional object 44 by performing low-accuracy additive machining on the part 43. Every portion of the three-dimensional object 44 except the part 43 still has a portion to be removed so that the shape of the sections 32 and 33 can be obtained. The third step P4-3 is a machining step performed by "device B1" for obtaining the shape of the sections 32 and 33 by performing high-accuracy removal machining on every portion of the three-dimensional object 44 except the part 43.

The fifth process pattern P5 is a combination of a first step P5-1, a second step P5-2, a third step P5-3, and a fourth step P5-4. The first step P5-1 is a step for procuring a material 45 by purchasing the material 45. The second step P5-2 is a machining step performed by "device B2" for obtaining a three-dimensional object 46 with low-accuracy removal machining. Every portion of the three-dimensional object 46 still has a portion to be removed so that the shape of the sections 31 and 32 can be obtained. The third step P5-3 is a machining step performed by "device A2" for obtaining a three-dimensional object 47 by performing low-accuracy additive machining on the three-dimensional object 46. Every portion of the three-dimensional object 47 still has a portion to be removed so that the whole shape can be obtained. "Device B2" and "device A2" perform what is called near net shaping to obtain a shape close to the shape of the product 30. The fourth step P5-4 is a machining step performed by "device B1" for obtaining the whole shape of the product 30 by performing high-accuracy removal machining on the three-dimensional object 47.

The process pattern generation unit 17 can generate any other process pattern as a combination of machining steps performed by different machining devices, in addition to the first, second, third, fourth, and fifth process patterns P1, P2, P3, P4, and P5. By appropriately combining how and to what degree of accuracy additive machining and removal machining are performed for each of the sections 31, 32, and 33, the process pattern generation unit 17 can obtain process patterns as various combinations of machining steps. By appropriately combining additive machining and removal machining, the process decision support device 100 can present the user with process patterns that can be options from the viewpoint of reducing the manufacturing cost or the manufacturing time required.

The process pattern generation unit 17 refers to the machining performance data of each machining device and identifies machining devices that can perform machining according to design particulars such as shape, size, material, and manufacturing accuracy for the entire product 30 or for each section. The process pattern generation unit 17 generates process patterns by sequencing and combining machining steps performed by the identified machining devices. Manufacturing processes that require fewer changeovers, i.e. work associated with the switching of machining devices or the change of process contents, are more efficient for manufacturing the product 30. In the first embodiment, the process pattern generation unit 17 generates process patterns by giving priority to process patterns that require fewer changeovers in the manufacture of the product 30. In addition, as the number of sections of one product 30 to be processed in different machining steps decreases, the number of changeovers decreases. Therefore, the process pattern generation unit 17 generates process patterns by giving priority to process patterns in which the number of sections to be processed in different machining steps is small.

FIG. 5 is a diagram illustrating a display example of the contents of process patterns generated by the process pattern generation unit 17 illustrated in FIG. 1. The process decision support device 100 displays a table that describes the contents of generated process patterns on a screen 50 of the display 25 illustrated in FIG. 2. On the screen 50, "process pattern 1", "process pattern 2", "process pattern 3", "process pattern 4", and "process pattern 5" respectively represent the first process pattern P1, the second process pattern P2, the third process pattern P3, the fourth process pattern P4, and the fifth process pattern P5 illustrated in FIG. 4.

On the screen 50, the contents of the steps included in each process pattern are displayed together with the name of the process pattern. "Addition" and "device A1" displayed next to "process pattern 1" represent the contents of the first step P1-1. "Purchase" and "material C1" displayed next to "process pattern 2" represent the contents of the first step P2-1. "Material C1" is the name of the material 41 illustrated in FIG. 4. "Removal" and "device B1" represent the contents of the second step P2-2, which is the step following the first step P2-1. For "process pattern 3", the contents of the first step P3-1 and the contents of the second step P3-2, which is the step following the first step P3-1, are displayed.

For "process pattern 4", the contents of the first step P4-1 to the third step P4-3 are displayed in a manner similar to that for "process pattern 1" to "process pattern 3". "Part D1" is the name of the part 43 illustrated in FIG. 4. For the "process pattern 5", the contents of the first step P5-1 to the fourth step P5-4 are displayed in a manner similar to that for "process pattern 1" to "process pattern 4". "Material C2" is the name of the material 45 illustrated in FIG. 4. The user chooses a process pattern as the manufacturing process of the product 30 from among the process patterns displayed on the screen 50.

The output unit 13 displays the process patterns generated by the process pattern generation unit 17 in order of decreasing simplicity. Simpler process patterns have fewer steps. On the screen 50 illustrated in FIG. 5, among the first, second, third, fourth, and fifth process patterns P1, P2, P3, P4, and P5, the contents of the first process pattern P1 having the fewest processes are displayed at the top, and the contents of the second, third, fourth, and fifth process patterns P2, P3, P4, and P5 are displayed such that process patterns having fewer processes are arranged in upper stages.

The process pattern generation unit 17 may set a limit on the number of process patterns generated. In a case where the number of process patterns generated is set to "five", the process pattern generation unit 17 ends the generation of process patterns at the time that the generation of the first, second, third, fourth, and fifth process patterns P1, P2, P3, P4, and P5 is completed.

In a case where the number of process patterns displayed on the screen 50 is five and the number of process patterns generated by the process pattern generation unit 17 is six or more, the output unit 13 may display the sixth and subsequent process patterns in response to scrolling on the screen 50. The process pattern generation unit 17 may generate five process patterns: the sixth to tenth process patterns, in response to the user's instruction for scrolling on the screen 50.

The output unit 13 displays, on the screen 50, the contents of the process patterns generated by the process pattern generation unit 17, and accepts, on the screen 50, the selection of a process pattern to be designated as the manufacturing process of the product 30. The user operates the input unit 12 to select a desired process pattern as the manufacturing process of the product 30 from among the process patterns displayed on the screen 50. Thus, the user can select a desired process pattern based on the contents of the process patterns displayed on the screen 50 and determine the manufacturing process. Process patterns other than the process patterns displayed before a desired process pattern is selected by the user are process patterns that have no possibility to be selected by the user. The process pattern generation unit 17 can generate process patterns each time a scroll instruction is received so as to reduce wasteful calculation processing due to generation of process patterns that have no possibility to be selected.

Figure 6:
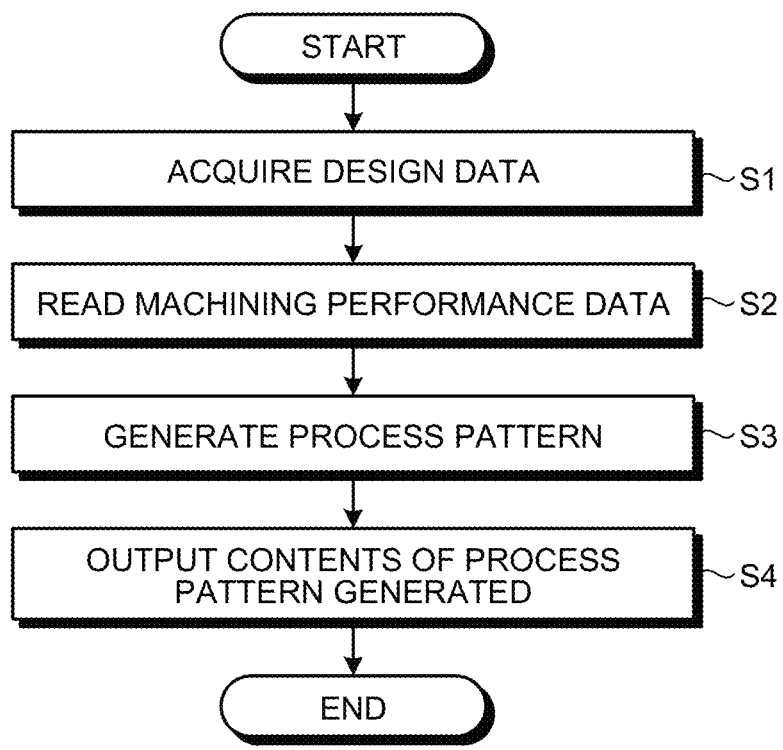
FIG. 6 is a flowchart illustrating the procedure of operation by the process decision support device illustrated in FIG. 1.

FIG. 6 is a flowchart illustrating the procedure of operation by the process decision support device 100 illustrated in FIG. 1. In step S1, the process decision support device 100 acquires design data. The process decision support device 100 may acquire design data through manual input at the input unit 12, or may acquire design data by reading design data from a storage medium or another device. The design data storage unit 14 stores the acquired design data.

In step S2, the process pattern generation unit 17 reads the machining performance data stored in the machining performance data storage unit 15. In step S3, the process pattern generation unit 17 generates a process pattern based on the design data read from the design data storage unit 14. The process pattern generation unit 17 refers to the machining performance data read in step S2 and generates a process pattern.

In step S4, the output unit 13 outputs the contents of the process pattern generated in step S3. Then, the process decision support device 100 ends the operation procedure illustrated in FIG. 6.

According to the first embodiment, the process decision support device 100 sequences and allocates machining steps performed by machining devices included in a plurality of machining devices to generate a process pattern with which a product is manufacturable. The user can determine the manufacturing process regardless of experience by selecting a process pattern as the manufacturing process from among the process patterns generated by the process decision support device 100. The user can also determine the manufacturing process without trial and error. Thus, the process decision support device 100 can achieve the effect of enabling easy determination of a manufacturing process including machining steps performed by a plurality of machining devices.

Second Embodiment

Figure 7:
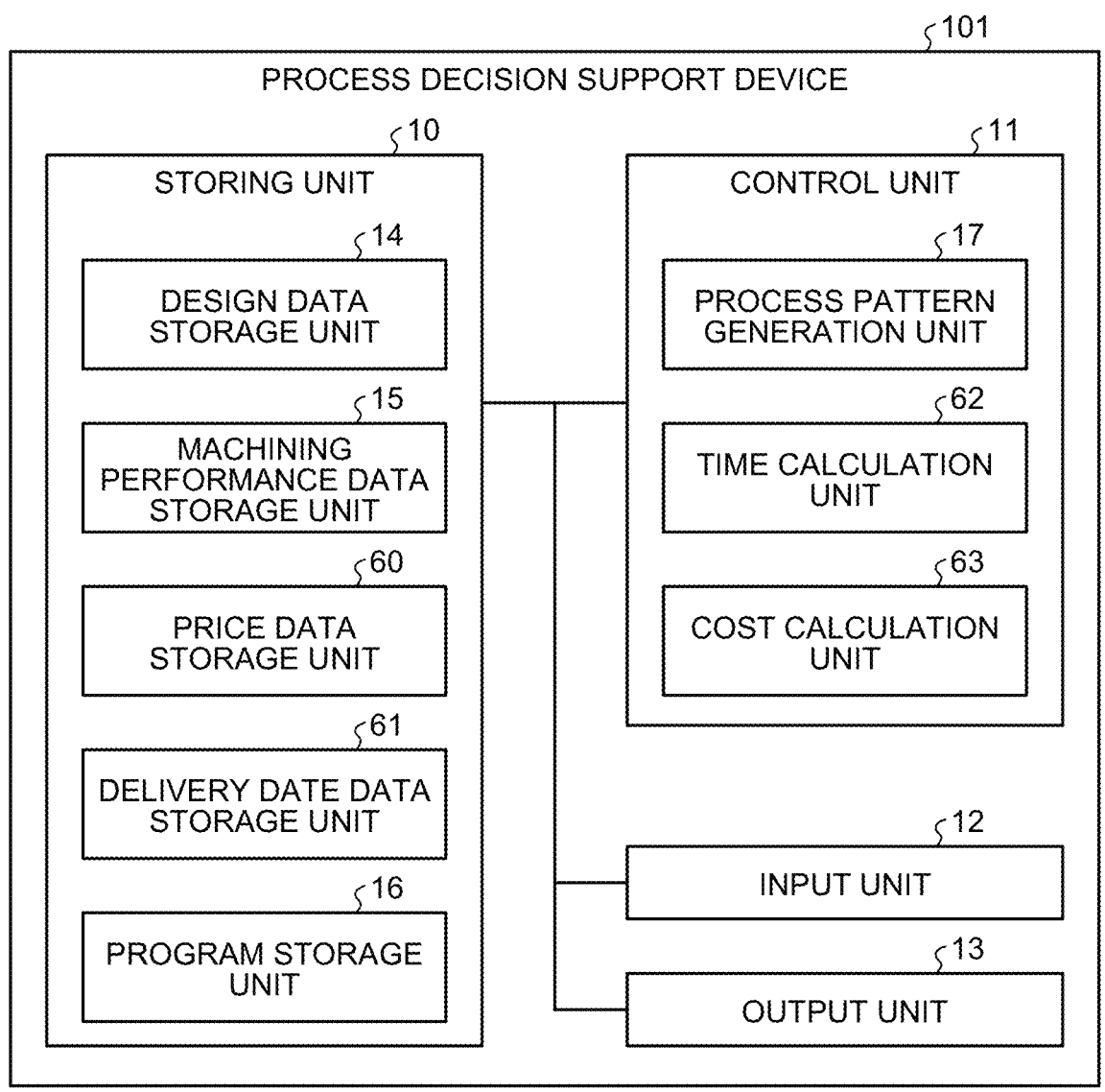
FIG. 7 is a block diagram illustrating a configuration of a process decision support device according to a second embodiment of the present invention.

FIG. 7 is a block diagram illustrating a configuration of a process decision support device 101 according to the second embodiment of the present invention. The process decision support device 101 calculates the time and cost required to complete manufacturing a product according to a generated process pattern. In the second embodiment, components identical to those in the first embodiment are denoted by the same reference signs, and configuration differences from the first embodiment will be mainly described.

The storing unit 10 includes, in addition to the components of the storing unit 10 illustrated in FIG. 1, a price data storage unit 60 which is a functional unit that stores price data and a delivery date data storage unit 61 which is a functional unit that stores delivery date data. Price data are data on the price of materials procured for removal machining, materials used for additive machining, and procurable parts. Price data also include data on the price of tools that need to be replaced at every machining step in removal machining. The process decision support device 101 acquires price information presented by the sellers of materials, parts, and tools, and stores the acquired information in the price data storage unit 60, thereby accumulating price data for materials, parts, and tools used for machining with a plurality of machining devices. The price data storage unit 60 may store the price data edited by the user.

Delivery date data are data representing the period required from ordering to delivery of the above materials, parts, and tools. The process decision support device 101 acquires delivery date information presented by the sellers of materials, parts, and tools, and stores the acquired information in the delivery date data storage unit 61, thereby accumulating delivery date data for materials, parts, and tools used for machining with a plurality of machining devices. The delivery date data storage unit 61 may store the delivery date data edited by the user.

The machining performance data stored in the machining performance data storage unit 15 include data on the running cost for operating machining devices. The running cost includes electricity and costs for procuring supplies that need to be replaced or replenished on a regular basis.

The control unit 11 includes a time calculation unit 62 and a cost calculation unit 63 in addition to the component of the control unit 11 illustrated in FIG. 1. The time calculation unit 62 is a functional unit that calculates the time required to complete manufacturing a product according to a process pattern generated by the process pattern generation unit 17. The cost calculation unit 63 is a functional unit that calculates the cost required to complete manufacturing a product according to a process pattern generated by the process pattern generation unit 17.

The time calculation unit 62 refers to the delivery date data stored in the delivery date data storage unit 61 and simulates the delivery waiting time, i.e. the time until the materials, parts, and tools required in a generated process pattern are prepared. The time calculation unit 62 also refers to the machining performance data stored in the machining performance data storage unit 15 and simulates the machining time, i.e. the time required from the start to the end of the manufacture of a product according to a generated process pattern. The time calculation unit 62 adds together the delivery waiting time and the machining time obtained by simulation to calculate the total time required to complete manufacturing the product according to the generated process pattern.

The cost calculation unit 63 refers to the price data stored in the price data storage unit 60 and simulates the procurement cost, i.e. the cost for procuring the materials, parts, and tools used in a generated process pattern. The cost calculation unit 63 also refers to the machining performance data stored in the machining performance data storage unit 15 and simulates the running cost for manufacturing a product according to a generated process pattern. The cost calculation unit 63 adds together the procurement cost and the running cost obtained by simulation to calculate the total cost required to complete manufacturing the product according to the generated process pattern.

The output unit 13 outputs the contents of process patterns generated by the process pattern generation unit 17, the results of calculation by the time calculation unit 62, and the results of calculation by the cost calculation unit 63. The process decision support device 101 may include an output unit that outputs the results of calculation by the time calculation unit 62 and the results of calculation by the cost calculation unit 63, separately from the output unit that outputs the contents of process patterns generated by the process pattern generation unit 17.

FIG. 8 is a diagram illustrating a display example of results of calculation by the time calculation unit 62 of the process decision support device 101 illustrated in FIG. 7 and results of calculation by the cost calculation unit 63 of the process decision support device 101. On the screen 50 of the display 25 illustrated in FIG. 2, the output unit 13 displays numerical values indicating time as the results of calculation by the time calculation unit 62 and numerical values indicating costs as the results of calculation by the cost calculation unit 63, together with the contents of generated process patterns. The contents of the process patterns illustrated in FIG. 8 are the same as the contents of the process patterns illustrated in FIG. 5.

The screen 50 illustrated in FIG. 8 displays the time and cost for each machining step in each process pattern and the total time and total cost for each process pattern. For "process pattern 1", a numerical value "$\alpha 1$" indicating the result of time calculation and a numerical value "$\beta 1$" indicating the result of cost calculation for the first step P1-1 are displayed. A numerical value "$\alpha 1$" indicating the total time and a numerical value "$\beta 1$" indicating the total cost for "process pattern 1" are also displayed.

For "process pattern 2", a numerical value "$\alpha 2$" indicating the result of time calculation and a numerical value "$\beta 2$" indicating the result of cost calculation for the first step P2-1 are displayed. A numerical value "$\alpha 3$" indicating the result of time calculation and a numerical value "$\beta 3$" indicating the result of cost calculation for the second step P2-2 are displayed. A numerical value "$\alpha 2+\alpha 3$" indicating the total time and a numerical value "$\beta 2+\beta 3$" indicating the total cost for "process pattern 2" are also displayed.

For "process pattern 3", in the same manner as for "process pattern 1" and "process pattern 2", the results of time calculation and the results of cost calculation for the first step P3-1 and the second step P3-2 and the total time and the total cost are displayed. For "process pattern 4", in the same manner as for "process pattern 1" to "process pattern 3", the results of time calculation and the results of cost calculation for the first step P4-1 to the third step P4-3 and the total time and the total cost are displayed. For "process pattern 5", in the same manner as for "process pattern 1" to "process pattern 4", the results of time calculation and the results of cost calculation for the first step P5-1 to the fourth step P5-4 and the total time and the total cost are displayed.

Because the results of calculation by the time calculation unit 62 for each process pattern are displayed, the user can select a process pattern as the manufacturing process of the product in consideration of the time required to complete the product. Because the results of calculation by the cost calculation unit 63 for each process pattern are displayed, the user can select a process pattern as the manufacturing process of the product in consideration of the cost required to complete the product.

The output unit 13 may output details of the results of calculation by the time calculation unit 62. As details of the results of calculation by the time calculation unit 62, the output unit 13 may display, by category, the delivery waiting time for materials, parts, and tools and the machining time for each process pattern. This allows the user to select a process pattern in consideration of the time required to wait for delivery of materials, parts, and tools and the machining time required to manufacture the product.

The output unit 13 may output details of the results of calculation by the cost calculation unit 63. As details of the results of calculation by the cost calculation unit 63, the output unit 13 may display, by category, the procurement cost for materials, parts, and tools and the running cost for machining devices. This allows the user to select a process pattern in consideration of the procurement cost for materials, parts, and tools and the running cost for machining devices.

The output unit 13 may display process patterns such that process patterns that require shorter times as the results of calculation by the time calculation unit 62 are arranged in upper stages. This allows the user to easily select an advantageous process pattern in terms of the time required to complete the product. The output unit 13 may display process patterns such that process patterns that require lower costs as the results of calculation by the cost calculation unit 63 are arranged in upper stages. This allows the user to easily select an advantageous process pattern in terms of the cost required to complete the product.

FIG. 9 is a flowchart illustrating the procedure of operation by the process decision support device 101 illustrated in FIG. 7. The processes of steps S1 to S3 illustrated in FIG. 9 are the same as the processes of steps S1 to step S3 illustrated in FIG. 6.

In step S11, the cost calculation unit 63 reads the price data stored in the price data storage unit 60 and the machining performance data stored in the machining performance data storage unit 15. In step S11, the time calculation unit 62 reads the delivery date data stored in the delivery date data storage unit 61 and the machining performance data stored in the machining performance data storage unit 15.

In step S12, the time calculation unit 62 refers to the delivery date data and the machining performance data read in step S11 and calculates the time required for each process pattern. The time calculation unit 62 calculates the time required to complete manufacturing a product according to a generated process pattern. In step S12, the cost calculation unit 63 refers to the price data and the machining performance data read in step S11 and calculates the cost required for each process pattern. The cost calculation unit 63 calculates the cost required to complete manufacturing a product according to a generated process pattern.

In step S13, the output unit 13 outputs the contents of the process pattern generated in step S3, the result of time calculation in step S12, and the result of cost calculation in step S12. Then, the process decision support device 101 ends the operation procedure illustrated in FIG. 9.

According to the second embodiment, the process decision support device 101 calculates the time required to complete manufacturing a product according to a generated process pattern. The user can select a process pattern as the manufacturing process of the product in consideration of the time required to complete the product. The process decision support device 101 calculates the cost required to complete manufacturing a product according to a generated process pattern. The user can select a process pattern as the manufacturing process of the product in consideration of the cost required to complete the product. Thus, the process decision support device 101 can achieve the effect of enabling easy determination of a manufacturing process including machining steps performed by a plurality of machining devices.

Third Embodiment

Figure 10:
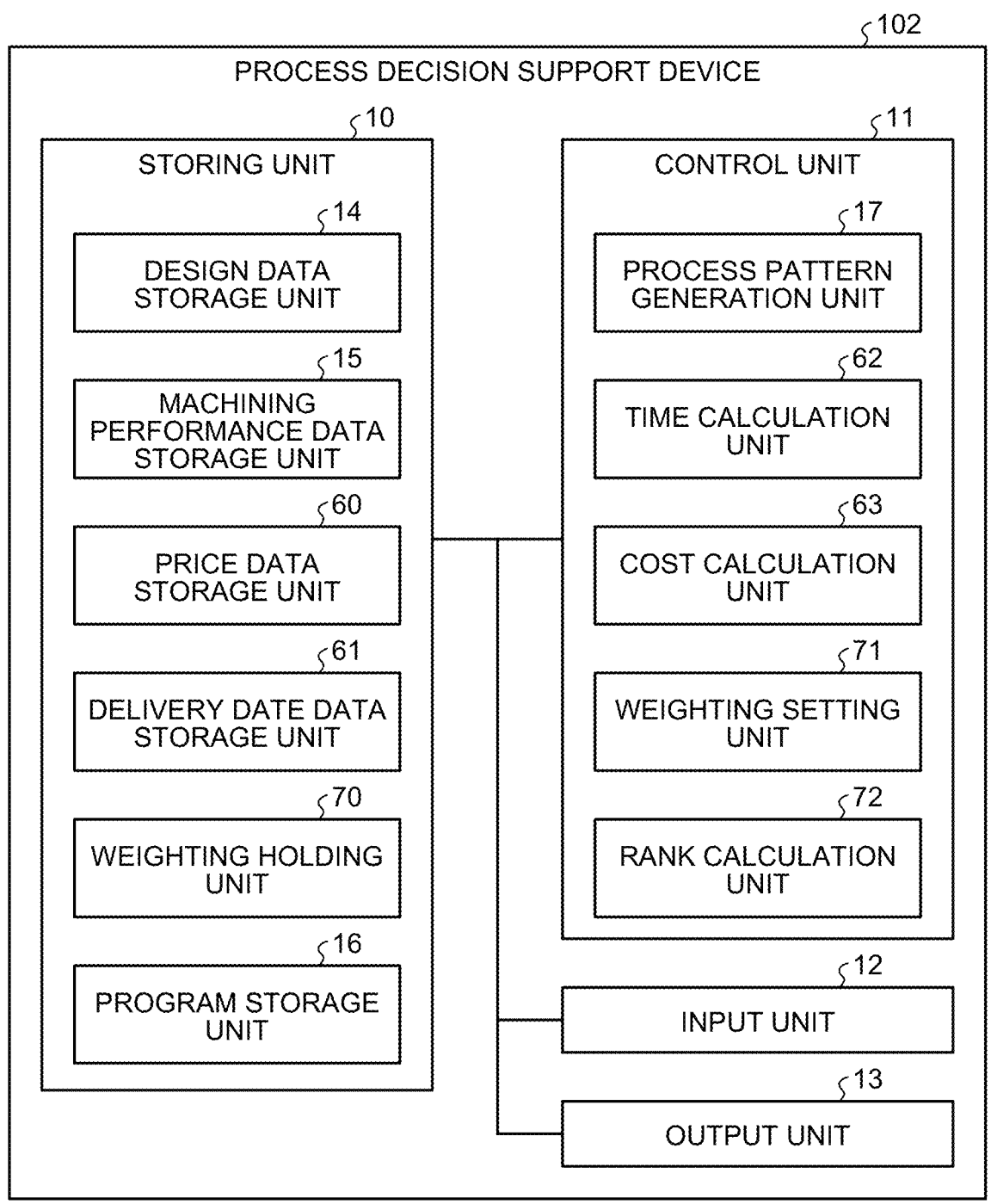
FIG. 10 is a block diagram illustrating a configuration of a process decision support device according to a third embodiment of the present invention.

FIG. 10 is a block diagram illustrating a configuration of a process decision support device 102 according to the third embodiment of the present invention. The process decision support device 102 calculates the recommended rank for each process pattern based on the results of calculation by the time calculation unit 62 and the results of calculation by the cost calculation unit 63. In the third embodiment, components identical to those in the first and second embodiments are denoted by the same reference signs, and configuration differences from the first and second embodiments will be mainly described.

The storing unit 10 includes a weighting holding unit 70 which is a functional unit that holds a weighting setting, in addition to the components of the storing unit 10 illustrated in FIG. 7. The control unit 11 includes, in addition to the components of the control unit 11 illustrated in FIG. 7, a weighting setting unit 71 which is a functional unit that sets weighting, and a rank calculation unit 72 which is a functional unit that calculates the recommended rank for each process pattern.

The process decision support device 102 acquires, through manual input at the input unit 12, the user's preference as to the balance of importance between time reduction and cost reduction in the decision of a manufacturing process. On the basis of the acquired preference, the weighting setting unit 71 sets weighting that is based on the priority balance between time reduction and cost reduction in the decision of a manufacturing process. The weighting holding unit 70 holds the weighting information set by the weighting setting unit 71. The rank calculation unit 72 refers to the weighting setting held by the weighting holding unit 70 and calculates the recommended rank for each process pattern.

The rank calculation unit 72 calculates the recommended score for each process pattern based on the results of calculation by the time calculation unit 62, the results of calculation by the cost calculation unit 63, and the weighting setting. The rank calculation unit 72 gives higher recommended ranks to process patterns having higher recommended scores calculated.

For example, the weighting setting unit 71 sets a ratio of "time:cost" representing weighting that is based on the priority balance between time reduction and cost reduction. When the user prefers to place equal importance on time reduction and cost reduction, the weighting setting unit 71 sets the weighting of "5:5". Based on this weighting setting, the rank calculation unit 72 calculates recommended ranks for the case that time reduction and cost reduction are of equal importance.

The rank calculation unit 72 calculates recommended ranks in which the balance between time reduction and cost reduction is adjusted based on the ratio set in the weighting setting unit 71. In a case where the weighting of "8:2" is set, the rank calculation unit 72 calculates recommended ranks for the case that time reduction is more important than cost reduction with the balance of "8:2". In a case where the weighting of "3:7" is set, the rank calculation unit 72 calculates recommended ranks for the case that cost reduction is more important than time reduction with the balance of "3:7". The rank calculation unit 72 may calculate recommended ranks using any method. In the third embodiment, details of the method of calculation by the rank calculation unit 72 are omitted.

FIG. 11 is a diagram illustrating a display example of results of calculation by the rank calculation unit 72 of the process decision support device 102 illustrated in FIG. 10. On the screen 50 of the display 25 illustrated in FIG. 2, the output unit 13 displays numerical values indicating recommended ranks as the results of calculation by the rank calculation unit 72, together with the contents of generated process patterns, the results of calculation by the time calculation unit 62, and the results of calculation by the cost calculation unit 63. The contents of the process patterns, the results of calculation by the time calculation unit 62, and the results of calculation by the cost calculation unit 63 illustrated in FIG. 11 are the same as those illustrated in FIG. 8.

On the screen 50 illustrated in FIG. 11, the "rank" displayed for each process pattern represents the recommended rank. For "process pattern 1", the recommended rank "5" of the first process pattern P1 is displayed. Similarly, for "process pattern 2" to "process pattern 5", the recommended ranks "4", "2", "3", and "1" of the second, third, fourth, and fifth process patterns P2, P3, P4, and P5 are displayed, respectively.

Among the process patterns displayed on the screen 50 illustrated in FIG. 11, the fifth process pattern P5 has the highest recommended rank and the first process pattern P1 has the lowest recommended rank. Among the process patterns displayed on the screen 50, the balance between time reduction and cost reduction of the fifth process pattern P5 is closest to the balance of the user's preference. The balance between time reduction and cost reduction becomes farther from the balance of the user's preference in the order of the third process pattern P3, the fourth process pattern P4, the second process pattern P2, and the first process pattern P1. The balance between time reduction and cost reduction of the first process pattern P1 is farthest from the balance of the user's preference. Because the recommended rank for each process pattern is displayed, the user can easily select a process pattern in which the balance between time reduction and cost reduction is close to the balance of the user's preference.

FIG. 12 is a flowchart illustrating the procedure of operation by the process decision support device 102 illustrated in FIG. 10. The processes of steps S1 to S12 illustrated in FIG. 12 are the same as the processes of steps S1 to step S12 illustrated in FIG. 9.

In step S21, the rank calculation unit 72 refers to the result of time calculation in step S12, the result of cost calculation in step S12, and the weighting setting held by the weighting holding unit 70 and calculates the recommended rank for each process pattern.

In step S22, the output unit 13 outputs the contents of the process pattern generated in step S3, the result of time calculation in step S12, the result of cost calculation in step S12, and the result of recommended rank calculation in step S21. Then, the process decision support device 102 ends the operation procedure illustrated in FIG. 12.

According to the third embodiment, the process decision support device 102 calculates the recommended rank for each process pattern based on the results of calculation of the time required to complete the product and the results of calculation of the cost required to complete the product. The user can select a process pattern as the manufacturing process of the product in consideration of whether the balance between time reduction and cost reduction is close to the balance of the user's preference. Thus, the process decision support device 102 can achieve the effect of enabling easy determination of a manufacturing process including machining steps performed by a plurality of machining devices.

The configurations described in the above-mentioned embodiments indicate examples of the contents of the present invention. The configurations can be combined with another well-known technique, and some of the configurations can be omitted or changed in a range not departing from the gist of the present invention.

REFERENCE SIGNS LIST 10 storing unit; 11 control unit; 12 input unit; 13 output unit; 14 design data storage unit; 15 machining performance data storage unit; 16 program storage unit; 17 process pattern generation unit; 20 CPU; 21 RAM; 22 ROM; 23 external storage device; 24 input device; 25 display; 26 bus; 30 product; 31, 32, 33 section; 41, 45 material; 42, 44, 46, 47 three-dimensional object; 43 part; 50 screen; 60 price data storage unit; 61 delivery date data storage unit; 62 time calculation unit; 63 cost calculation unit; 70 weighting holding unit; 71 weighting setting unit; 72 rank calculation unit; 100, 101, 102 process decision support device; P1 first process pattern; P1-1, P2-1, P3-1, P4-1, P5-1 first step; P2 second process pattern; P2-2, P3-2, P4-2, P5-2 second step; P3 third process pattern; P4 fourth process pattern; P4-3, P5-3 third step; P5 fifth process pattern; P5-4 fourth step.

The invention claimed is:

1. A process decision support device for supporting decision of a manufacturing process for manufacturing a product, the process decision support device comprising:
   a machining performance data storage to store machining performance data indicating machining performance of each of a plurality of machining devices including a machining device that deposits melted material to shape a three-dimensional object and a machining device that removes material; and
   a processor configured to implement:
   a process pattern generator to select, from among the plurality of machining devices, a machining device applicable to manufacture of the product with reference to the machining performance data, and sequence and allocate machining steps performed by the machining device selected to generate a process pattern as a combination of the machining steps with which the product is manufacturable;
   a time calculator to calculate a time required to complete manufacturing the product according to the process pattern generated by the process pattern generator;
   a cost calculator to calculate a cost required to complete manufacturing the product according to the process pattern generated by the process pattern generator; and
   a transmitter to output content of the process pattern generated by the process pattern generator, a result of calculation by the time calculator, and a result of calculation by the cost calculator, wherein
   the transmitter outputs a total time for the process pattern and a total cost for the process pattern and a result of time calculation for each of the machining steps in the process pattern and a result of cost calculation for each of the machining steps in the process pattern,
   the process pattern generator generates a plurality of process patterns including a process pattern for both a machining device that deposits melted material and a machining device that removes material,
   the processor is further configured to implement a rank calculator to calculate a recommended rank for each of the plurality of process patterns based on a result of calculation by the time calculator and a result of calculation by the cost calculator,
   the transmitter outputs a result of calculation by the rank calculator,
   the processor is further configured to implement a weighting setter to set weighting that is based on a user input of a priority balance between time reduction and cost reduction in the decision of the manufacturing process,
   the rank calculator calculates the recommended rank based on the result of calculation by the time calculator, the result of calculation by the cost calculator, and the weighting set, and
   the transmitter displays, on a screen, the plurality of process patterns in order of the recommended rank.

2. The process decision support device according to claim 1, wherein the process pattern generator generates a process pattern as a combination of multiple machining steps.

3. The process decision support device according to claim 2, wherein the process pattern generator generates a plurality of process patterns that differ in at least one of sequence and combination of the machining steps.

4. The process decision support device according to claim 1, wherein the process pattern generator generates the process pattern including a step of procuring material.

5. The process decision support device according to claim 1, wherein the process pattern generator generates the process pattern including a step of procuring a part manufactured by a device other than the machining devices included in the plurality of machining devices.

6. The process decision support device according to claim 1, further comprising a user input device that accepts, on the screen, selection of a process pattern from among the plurality of process patterns to be designated as the manufacturing process.

7. The process decision support device according to claim 1, wherein, based on a shape of the product, the process pattern generator divides the product into a plurality of sections at a suitable position for division into machining steps performed by the plurality of machining devices, and allocates machining steps to the plurality of sections to generate the process pattern.

8. A process decision support method that is implemented by a process decision support device that supports decision of a manufacturing process for manufacturing a product, the process decision support method comprising:

reading machining performance data indicating machining performance of each of a plurality of machining devices including a machining device that deposits melted material to shape a three-dimensional object and a machining device that removes material;

selecting, from among the plurality of machining devices, a machining device applicable to manufacture of the product with reference to the machining performance data, and sequencing and allocating machining steps performed by the machining device selected to generate a process pattern as a combination of the machining steps with which the product is manufacturable;

calculating a time required to complete manufacturing the product according to the process pattern generated;

calculating a cost required to complete manufacturing the product according to the process pattern generated; and outputting content of the process pattern generated, a total time for the process pattern and a total cost for the process pattern, and a result of time calculation for each of the machining steps in the process pattern and a result of cost calculation for each of the machining steps in the process pattern, wherein a plurality of process patterns are generated including a process pattern for both a machining device that deposits melted material and a machining device that removes material, a recommended rank is calculated and output for each of the plurality of process patterns based on a result of calculation by the time calculator and a result of calculation by the cost calculator, a weighting is set, that is based on a user input of a priority balance between time reduction and cost reduction in the decision of the manufacturing process, the recommended rank is calculated based on the result of calculation by the time calculator, the result of calculation by the cost calculator, and the weighting set, and the plurality of process patterns are displayed on a screen in order of the recommended rank.

9. A non-transitory computer-readable storage medium storing therein a process decision support program for causing a computer to function as a process decision support device that supports decision of a manufacturing process for manufacturing a product, the process decision support program causing the computer to execute:

reading machining performance data indicating machining performance of each of a plurality of machining devices including a machining device that deposits melted material to shape a three-dimensional object and a machining device that removes material;

selecting, from among the plurality of machining devices, a machining device applicable to manufacture of the product with reference to the machining performance data, and sequencing and allocating machining steps performed by the machining device selected to generate a process pattern as a combination of the machining steps with which the product is manufacturable;

calculating a time required to complete manufacturing the product according to the process pattern generated;

calculating a cost required to complete manufacturing the product according to the process pattern generated; and outputting content of the process pattern generated, a total time for the process pattern and a total cost for the process pattern, and a result of time calculation for each of the machining steps in the process pattern and a result of cost calculation for each of the machining steps in the process pattern, wherein a plurality of process patterns are generated including a process pattern for both a machining device that deposits melted material and a machining device that removes material, a recommended rank is calculated and output for each of the plurality of process patterns based on a result of calculation by the time calculator and a result of calculation by the cost calculator, a weighting is set, that is based on a user input of a priority balance between time reduction and cost reduction in the decision of the manufacturing process, the recommended rank is calculated based on the result of calculation by the time calculator, the result of calculation by the cost calculator, and the weighting set, and the plurality of process patterns are displayed on a screen in order of the recommended rank.

* * * * *